Oct. 31, 1961    G. O. JOHNSON    3,006,678
FISH GAFF
Filed May 20, 1960    2 Sheets-Sheet 2
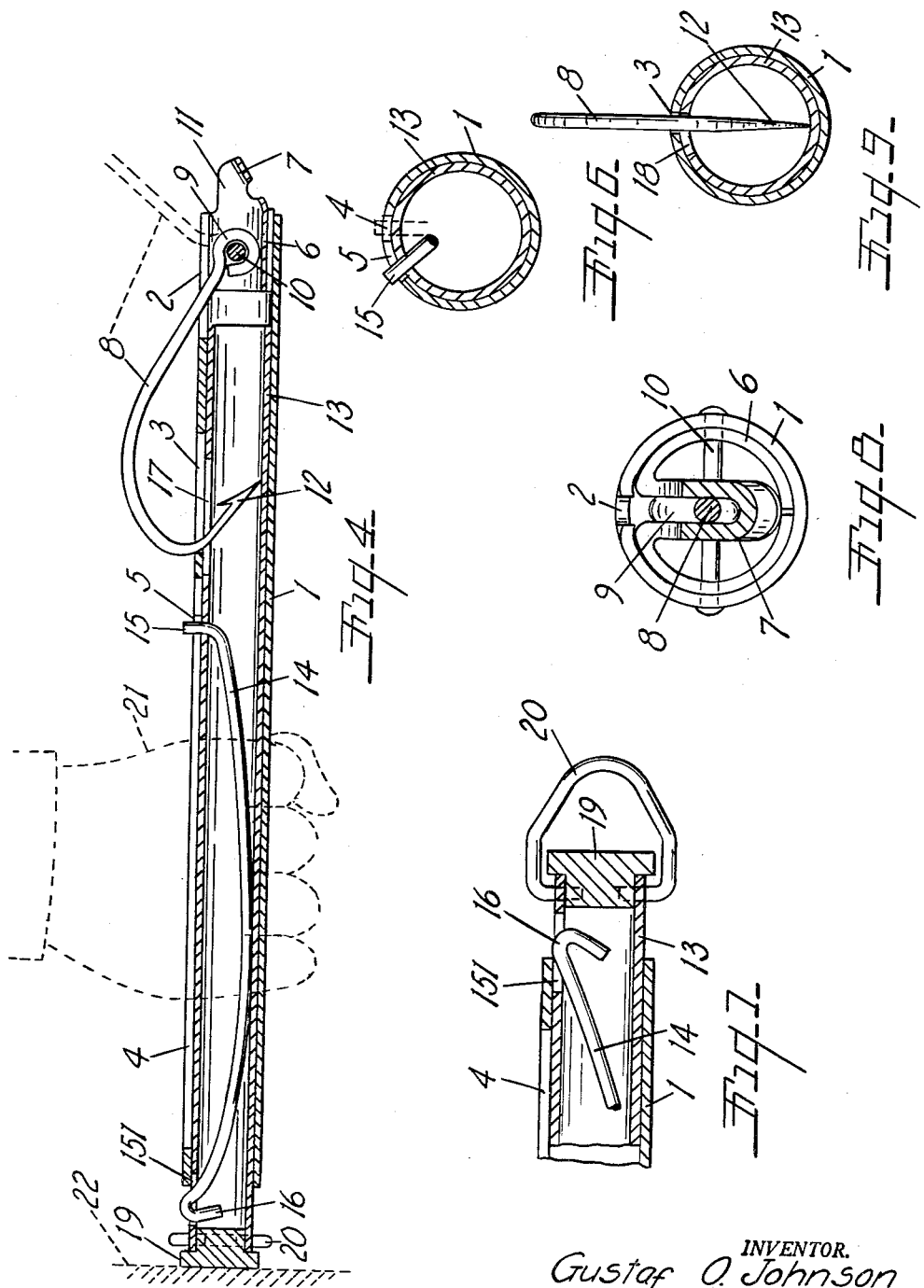
INVENTOR.
Gustaf O. Johnson
BY
ATTORNEY.

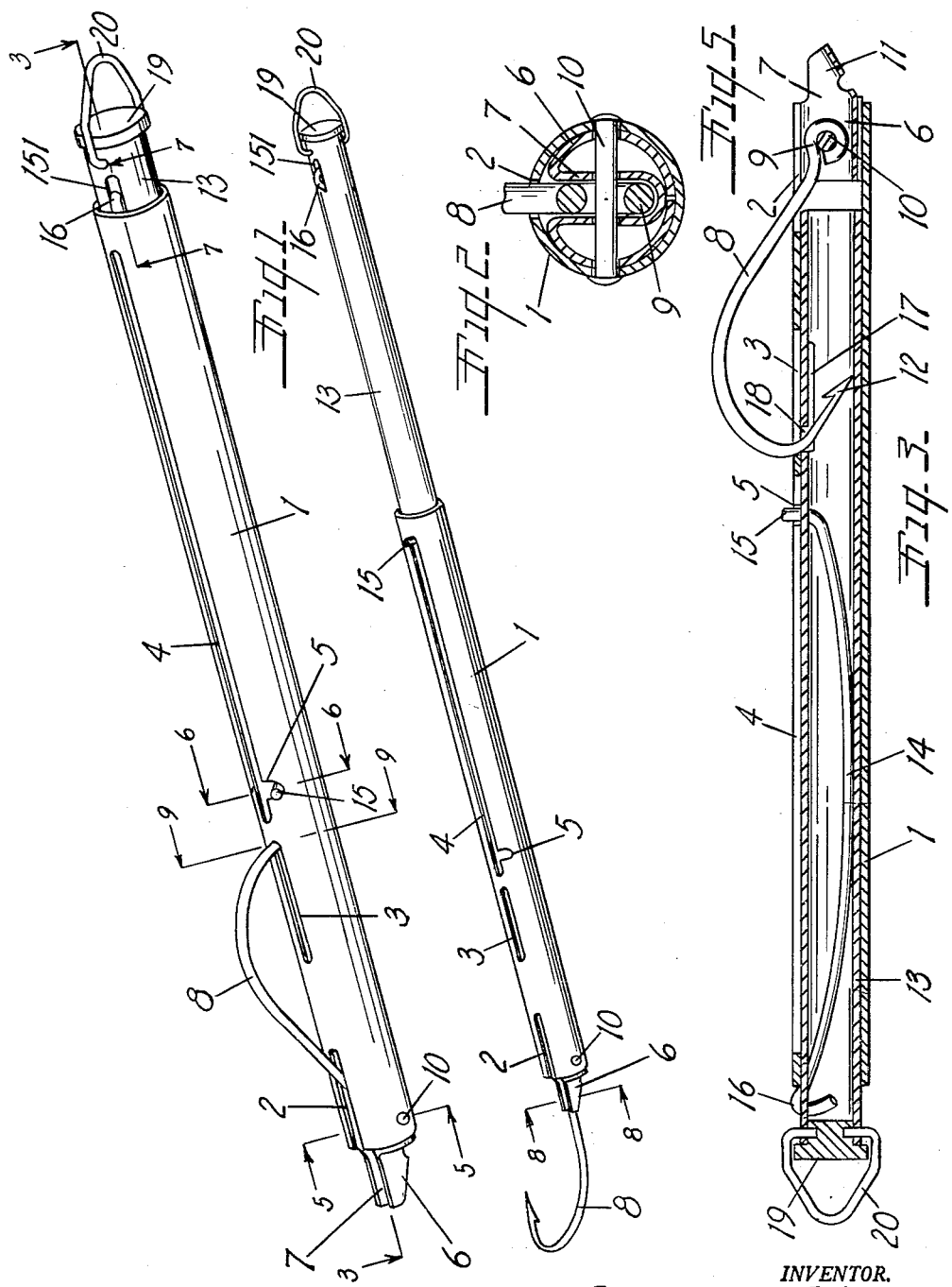

3,006,678
FISH GAFF
Gustaf O. Johnson, 149 Larson Ave., Elkhart, Ind.
Filed May 20, 1960, Ser. No. 30,653
10 Claims. (Cl. 294—26)

This invention relates to a fish gaff. The main objects are—

First, to provide a fish gaff including a hook mounted to be extended to use position or to be collapsed and retained in its collapsed position with its point or tip portion housed and guarded.

Second, to provide a fish gaff having the above stated advantage in which the hook may be ejected from its collapsed position without manual manipulation of the hook.

Third, to provide a fish gaff including a body member having a hook pivotally mounted thereon so that it may be adjusted to use position, in which it extends from the inner end of the body member or collapsed with its tip portion within the body member and guarded thereby and including hook ejecting means which may be actuated by bringing it into impact contact with a surface.

Objects relating to details and economies of the invention will appear from the description to follow. The invention is defined and pointed out in the claims.

A preferred embodiment of the invention is illustrated in the accompanying drawing, in which:

FIG. 1 is a perspective view of a gaff embodying my invention with the hook in collapsed position.

FIG. 2 is a similar perspective view with the hook in extended or use position.

FIG. 3 is a view mainly in longitudinal section on a line corresponding to line 3—3 of FIG. 1.

FIG. 4 is a view mainly in longitudinal section corresponding to FIG. 3 and illustrating one of the steps in manipulation of the gaff to extend the hook to use position.

FIG. 5 is an enlarged fragmentary section on a line corresponding to line 5—5 of FIG. 1.

FIG. 6 is a transverse section on a line corresponding to line 6—6 of FIG. 1, a fragment of the latch member being shown in full lines.

FIG. 7 is an enlarged fragmentary view on a line corresponding to line 7—7 of FIG. 1.

FIG. 8 is an enlarged view in section on a line corresponding to line 8—8 of FIG. 2, illustrating details of the hook supporting means.

FIG. 9 is a cross-sectional view on a line corresponding to line 9—9 of FIG. 1.

The embodiment of my invention illustrated comprises the tubular body member 1 which is formed of a piece of tubing and which has spaced aligned outer slot 2, intermediate slot 3 and inner slot 4. The inner slot is provided adjacent to but spaced from its inner end, wtih a notch-like recess opening thereto and constituting a keeper 5, the purpose of which will appear as the description proceeds. The hook support member, designated by the numeral 6, is disposed in the outer end of the body member and is conformed to provide a U-shaped recess 7 which opens to the slot 2.

The gaff hook 8 illustrated is a fish hook of substantial size, the shank of which terminates in the eye 9 which is pivotally connected to the outer end of the body member by the pivot 10, see FIGS. 3 and 5. The hook supporting member 7 projects from the body member and is slotted at 11 to receive the hook in projected position, see FIG. 2. The slot 3 in the body member is of such length that the tip portion 12 of the hook may pass therethrough as shown in FIG. 3.

The hook lock and ejector member 13 is, in the embodiment illustrated formed of tubular stock and is a rotating and slidable fit in the body member 1. It may be collapsed therein as illustrated in FIGS. 1, 3 or 4, or extended therefrom as illustrated in FIG. 2, in which position it constitutes a handle extension for the body member.

In the embodiment illustrated the slot 4 terminates adjacent the outer end of the body member. The bowed springable latch and detent member, designated generally by the numeral 14, terminates at its inner end in the latch 15 and at its outer end in a detent portion 16, which projects through the slot 151 in the member 13. The member 14 is bowed to such an extent that when it is inserted in the member 13 it is under spring compression, which not only serves to hold it in place but to maintain the latch element 15 in projected position and yieldingly support the detent portion 16 thereof. The latch member 15 is engageable with the keeper 5 when aligned therewith and by rotative movement of the member 13. The member 13 is provided with a slot 17, see FIG. 4, which is aligned with the slot 3 on the body member in one adjusted position to receive the tip portion of the hook. The hook lock and ejecting member 13 has a notch-like recess 18 therein alignable with the tip portion of the hook when it is in collapsed position so that by rotative movement of the member 13 the hook is locked in its collapsed position, see FIGS. 3 and 9, and the detent 16 being under spring stress engagement with the outer end of the body member, as shown in FIG. 7, the parts are held in their adjusted position. At its outer end the member 13 is provided with a thrust member 19 and with a hanger loop 20 which, however, has no operative function.

When the parts are in collapsed position, the structure is compact and occupies relatively little space with fishing equipment. To ready for use as a preliminary step the member 13 is rotated to disengage the latch or bolt 15 from the keeper 5 and that adjustment disengages the hook latch. When it is desired to eject a hook a practical step is to grasp the body member, as indicated by the dotted lines at 21, and strike the abutment 19 against some surface or object conventionally illustrated at 22 in FIG. 4. That ejects the hook from its collapsed position as is indicated by dotted lines in FIG. 4 in which it is shown in partly erected position. If it does not swing to fully erected position it may be pushed into the support 11 by thrusting the hook against some surface. The member 13 can be drawn outward until the latch or bolt member 15 engages the outer end of the slot 4, in which position it constitutes a handle extension for the body member. In collapsing, the member 13 is collapsed into the member 1 until the slot 17 in the member 13 is aligned with the slot 3 in the body member and the hook is collapsed as shown in FIG. 4. The member 13 is then rotated to engage its bolt or latch with the keeper 5 and that locks the hook in collapsed position and the parts are held in hook locking position by the frictional engagement of the detent 16 with the inner end of the body member.

I have illustrated and described a highly practical embodiment of my invention and have not attempted to illustrate various modifications and adaptations, as it is believed that this disclosure will enable those skilled in the art to embody or adapt my invention as may be desired.

Having thus described the invention, what is claimed as new and desired to secure by Letters Patent is:

1. A gaff comprising a tubular body member constituting a handle and having spaced aligned outer, intermediate and inner longitudinally extending slots, the outer slot opening at the outer end of the body member, the inner slot terminating adjacent the inner end of the body member, the outer and intermediate slots being relatively short as compared to the inner slot, there being a lateral notch-like opening adjacent to but spaced inwardly from the outer end of the inner slot and opening thereto and constituting a keeper, a hook support fixedly secured in the outer end of said body member and having a slot therein aligned with said outer slot and a slotted hook rest projecting from the body member, a hook pivotally mounted in said hook support to be supported in projected relation to the body member or to be collapsed inwardly with the tip thereof disposed through said intermediate slot in said body member, a tubular handle extension, hook lock and ejector member telescopingly and rotatably disposed in said body member and having a slot therein alignable with said intermediate slot in said body member to receive the tip portion of the hook when it is collapsed, said hook lock and ejector member having a notch-like recess opening to said slot therein and constituting a hook latch, said hook lock and ejector member having a slot adjacent its outer end and a latch opening therein alignable with said keeper in said body member, and a bowed springable latch and detent member disposed in said lock and ejector member under spring compression stress and terminating at its inner end and retained by a laterally projecting latch projecting through said latch opening therein and having a detent at its outer end disposed through said slot adjacent the outer end of said lock and ejector member in frictional retaining engagement with the inner end of said body member when said lock and ejector member is in hook locking position, said latch member constituting a stop coacting with the outer end of said inner slot of said body member when the said lock and ejector member is in retracted position.

2. A gaff comprising a tubular body member constituting a handle and having spaced aligned outer, intermediate and inner longitudinally extending slots, the outer slot opening at the outer end of the body member, there being a lateral notch-like opening adjacent to but spaced inwardly from the outer end of the inner slot and opening thereto and constituting a keeper, a hook support fixedly secured in the outer end of said body member and having a slot therein aligned with said outer slot and a slotted hook rest, a hook pivotally mounted in said hook support to be supported in projected relation to the body member or to be collapsed inwardly with the tip thereof disposed through said intermediate slot in said body member, a tubular hook lock and ejector member telescopingly and rotatably disposed in said body member and having a slot therein alignable with said intermediate slot in said body member to receive the tip portion of the hook when it is collapsed, said hook lock and ejector member having a notch-like recess opening to said slot and constituting a hook latch, said hook lock and ejector member having a slot adjacent its outer end and a latch opening therein alignable with said keeper in said body member, and a bowed springable latch and detent member disposed in said lock and ejector member under spring compression stress and terminating at its inner end and retained by a laterally projecting latch projecting through said latch opening therein and having a detent at its outer end disposed through said slot adjacent the outer end disposed through said slot adjacent the outer end of said lock and ejector member in frictional retaining engagement with the inner end of said body member when said lock and ejector member is in hook locking position.

3. A gaff comprising a tubular body member constituting a handle and having spaced aligned outer, intermediate and inner longitudinally extending slots, the outer slot opening at the outer end of the body member, the inner slot terminating adjacent the inner end of the body member, the outer and intermediate slots being relatively short as compared to the inner slot, there being a lateral notch-like opening adjacent to but spaced inwardly from the outer end of the inner slot and opening thereto and constituting a keeper, a hook support fixedly secured in the outer end of said body member and having a slot therein aligned with said outer slot and a slotted hook rest projecting from the body member, a hook pivotally mounted in said hook support to be supported in projected relation to the body member or to be collapsed inwardly with the tip thereof disposed through said intermediate slot in said body member, and a tubular hook lock and ejector member telescopingly and rotatably disposed in said body member and having a slot therein alignable with said intermediate slot in said body member to receive the tip portion of the hook when it is collapsed and having a notch-like recess opening to said slot and constituting a hook latch, said handle extension hook lock and ejector member having a latch slidably engageable with said inner slot and engageable with said keeper by rotatable adjustment of said lock and ejector member, said lock and ejector member having a springable detent at its outer end which is in retaining frictional engagement with the inner end of the body member when said latch is in engagement with said keeper.

4. A gaff comprising a tubular body member constituting a handle and having spaced aligned outer, intermediate and inner longitudinally extending slots, the outer slot opening at the outer end of the body member, there being a lateral notch-like opening adjacent to but spaced inwardly from the outer end of the inner slot and opening thereto and constituting a keeper, a hook support fixedly secured in the outer end of said body member and having a slot therein aligned with said outer slot and a slotted hook rest projecting from the body member, a hook pivotally mounted in said hook support to be supported in projected relation to the body member or to be collapsed inwardly with the tip thereof disposed through said intermediate slot in said body member, and a tubular hook lock and ejector member telescopingly and rotatably disposed in said body member and having a slot therein alignable with said intermediate slot in said body member to receive the tip portion of the hook when it is collapsed and having a notch-like recess opening to said slot and constituting a hook latch, said handle extension hook lock and ejector member having a latch slidably engageable with said inner slot and engageable with said keeper by rotatable adjustment of said lock and ejector member.

5. A gaff comprising a tubular body member constituting a handle and having a hook tip end receiving slot therein and a second latch receiving slot at the inner side of said hook receiving slot, there being a lateral notch-like recess in said second slot constituting a keeper, a hook pivotally mounted on said body member to be projected therefrom into substantial alignment therewith or to be collapsed with its tip disposed in said hook receiving slot in said body member, and a hook lock and ejector member slidable and rotatable in said body member and projecting from the inner end of said body member and having a slot therein alignable with said hook receiving slot in said body member to receive the tip portion of the hook when it is collapsed, said hook lock and ejector member having a notch-like keeper opening to said slot to receive and retain the hook in collapsed position, the inner end of said hook receiving slot constituting a hook ejecting thrust element engageable with said hook for ejecting the same from its collapsed position, said hook lock and ejector member having a latch slidingly engageable with said latch receiving slot in said body member and engageable with said keeper by rotatable adjustment of said lock and ejector member, said lock and ejector member being provided with a springable detent frictionally engaging the body member and acting to frictionally hold the hook lock and ejector member in its hook locking position, said lock and ejector member constituting a handle extension for said body member when it is in retracted position.

6. A gaff comprising a tubular body member constituting a handle and having a hook tip end receiving slot therein and a second latch receiving slot at the inner side of said hook receiving slot, there being a lateral notch-like recess in said second slot constituting a keeper, a hook pivotally mounted on said body member to be projected therefrom into substantial alignment therewith or to be collapsed with its tip disposed in said hook receiving slot in said body member, and a hook lock and ejector member slidable and rotatable in said body member and projecting from the inner end of said body member and having a slot therein alignable with said hook receiving slot in said body member to receive the tip portion of the hook when it is collapsed, said hook lock and ejector member having a notch-like keeper opening to said slot to receive and retain the hook in collapsed position, the inner end of said hook receiving slot constituting a hook ejecting thrust element engageable with said hook for ejecting the same from its collapsed position, said hook lock and ejector member having a latch slidingly engageable with said latch receiving slot in said body member and engageable with said keeper by rotatable adjustment of said lock and ejector member.

7. A gaff comprising a tubular body member constituting a handle and having a hook tip receiving opening therein, a hook pivotally mounted on said body member to be projected therefrom or to be collapsed with the tip portion thereof in said opening, means for supporting said hook in its projected position in substantial alignment with said body member, a hook lock and ejector member slidable and rotatable in said body member and having an opening therein alignable with said hook receiving opening in said body member to receive the tip portion of the hook in its collapsed position and having a keeper retainingly engageable and disengageable with the hook when it is in collapsed position by rotating manipulation of said lock and ejector member, said body member and lock and ejector member having coacting keeper and latch means engageable to prevent longitudinal movement of said lock and ejector member with said hook lock and ejector means in hook retaining position, and means for frictionally holding said hook lock and ejector member in such position, said lock and ejector member constituting a handle extension for the body member when in its retracted position.

8. A gaff comprising a tubular body member constituting a handle and having a hook tip receiving opening therein, a hook pivotally mounted on said body member to be projected therefrom or to be collapsed with the tip portion thereof in said opening, means for supporting said hook in its projected position in substantial alignment with said body member, a hook lock and ejector member slidable and rotatable in said body member and having an opening therein alignable with said hook receiving opening in said body member to receive the tip portion of the hook in its collapsed position and having a keeper retainingly engageable and disengageable with the hook when it is in collapsed position by rotating manipulation of said lock and ejector member, said body member and lock and ejector member having coacting keeper and latch means engageable to prevent longitudinal movement of said lock and ejector member with said hook lock and ejector means in hook retaining position, and means for frictionally holding said hook lock and ejector member in such position.

9. A gaff comprising a tubular body member constituting a handle and having a hook tip receiving opening therein, a hook pivotally mounted on said body member to be projected therefrom or to be collapsed with the tip portion thereof in said opening, means for supporting said hook in its projected position in substantial alignment with said body member, and a hook lock and ejector member slidable and rotatable in said body member and having an opening therein alignable with said hook receiving opening in said body member to receive the tip portion of the hook in its collapsed position and having a keeper retainingly engageable and disengageable with the hook when it is in collapsed position by rotating manipulation of said lock and ejector member, said body member and lock and ejector member having coacting keeper and latch means engageable to prevent longitudinal movement of said lock and ejector member with said hook lock and ejector means in hook retaining position, said lock and ejector member constituting a handle extension for the body member when in its retracted position.

10. A gaff comprising a tubular body member constituting a handle and having a hook tip receiving opening therein, a hook pivotally mounted on said body member to be projected therefrom or to be collapsed with the tip portion thereof in said opening, means for supporting said hook in its projected position in substantial alignment with said body member, and a hook lock and ejector member slidable and rotatable in said body member and having an opening therein alignable with said hook receiving opening in said body member to receive the tip portion of the hook in its collapsed position and having a keeper retainingly engageable and disengageable with the hook when it is in collapsed position by rotating manipulation of said lock and ejector member, said body member and lock and ejector member having coacting keeper and latch means engageable to prevent longitudinal movement of said lock and ejector member with said hook lock and ejector means in hook retaining position.

References Cited in the file of this patent

UNITED STATES PATENTS

| | | |
|---|---|---|
| 2,214,660 | Darling | Sept. 10, 1940 |
| 2,679,429 | Martin | May 25, 1954 |
| 2,723,152 | Doty | Nov. 8, 1955 |